E. S. LESLIE.
VEGETABLE MASHER.
No. 188,383.        Patented March 13, 1877.
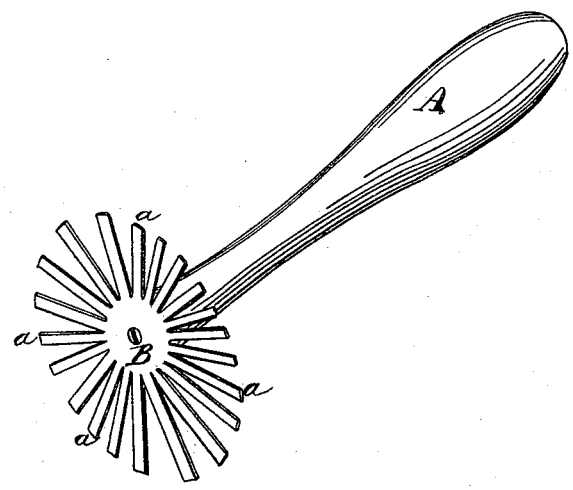
WITNESSES
INVENTOR

UNITED STATES PATENT OFFICE.

ELIZA S. LESLIE, OF SAXONVILLE, MASSACHUSETTS.

IMPROVEMENT IN VEGETABLE-MASHERS.

Specification forming part of Letters Patent No. 188,383, dated March 13, 1877; application filed November 22, 1876.

*To all whom it may concern:*

Be it known that I, Mrs. ELIZA S. LESLIE, of Saxonville, in the county of Middlesex and State of Massachusetts, have invented certain new and useful Improvements in Vegetable-Mashers; and I do hereby declare that the following is a full, clear, and exact description thereof, which will enable others skilled in the art to which it appertains to make and use the same, reference being had to the accompanying drawing and the letters of reference marked thereon, which forms a part of this specification, and which represents a perspective view of my improved vegetable-masher.

The object of my invention is to construct a cheap and convenient implement with which boiled potatoes, turnips, and like vegetables may be readily and quickly prepared for table use. Its construction and operation are as I shall now proceed to more fully describe.

In the drawing, A is the handle, which is made of wood or metal, in any suitable shape. To the lower end of this is secured the masher, which consists of a round disk, B, corresponding in size to the butt-end of the handle, to which it is secured, and having narrow radiating arms $a\ a$, by which the vegetables are cut or mashed. I prefer to construct this mashing-disk of a circular disk of sheet metal of considerable thickness, cutting from the same a series of triangular pieces, and thus leaving the disk ready to be attached to the handle or holder.

In operation, the vegetables that are to be mashed are placed in a dish, and the masher forced down against them in the usual manner, the disk B and radiating arms $a\ a$ crushing and cutting the vegetables to the desired consistency.

My improved implement is cheaper, more easily operated, and more effective than most vegetable-mashers as now ordinarily constructed.

Having thus described my invention, I claim and desire to secure by Letters Patent of the United States—

The improved vegetable-masher herein described, consisting of handle A and disk B, having narrow radiating arms $a\ a$, the mashing-disk consisting of a circular piece of sheet metal from which triangular pieces have been cut, and having a central perforation, substantially in the manner and for the purpose herein shown and specified.

ELIZA S. LESLIE.

Witnesses:
  Mrs. N. H. TAYLOR,
  F. C. STEARNS.